Patented Oct. 12, 1948

2,451,410

UNITED STATES PATENT OFFICE 2,451,410

THERMOSETTING LAMINATING SIRUPS

Edgar M. Queeny, Kirkwood, Mo., assignor to Monsanto Chemical Company, St. Louis, Mo., a corporation of Missouri No Drawing. Application November 19, 1947, Serial No. 787,022

6 Claims. (Cl. 260—38)

This invention relates to laminating syrups and to laminates made therewith.

With the advent of synthetic resinous materials, the use of laminated materials such as laminated paper, textiles, etc., has greatly increased due to the ease of making laminates with the new resins and to the ability to modify the properties of the resins to obtain varied results in the finished laminates. One of the problems presented by the laminates has been to obtain a surface on them which could be readily buffed and polished, but still would be resistant to abrasion. Another problem particularly in connection with laminated table tops, trays and other furniture, has been that when a highly polished laminate was used, articles placed thereon would slip from the furniture if it was tilted to even a slight degree.

It is an object of this invention to provide improved laminating syrups.

A further object is to provide improved thermosetting laminating syrups.

Another object is to provide laminated articles having abrasion resistant surfaces.

Still another object is to provide laminated articles which will retain dishes and the like on their surfaces even when said articles are tilted to a substantial degree.

These and other objects are attained by incorporating silica aerogels into laminating syrups and making laminations therefrom.

The following examples are given in illustration and are not intended as limitations on the processes and products of this invention. Where parts are mentioned, they are parts by weight.

Example I 126 parts of melamine were mixed with 243 parts of formalin (37% formaldehyde) and the pH of the mixture was adjusted to about 8-9 with aqueous sodium hydroxide. The mixture was heated at reflux temperature at atmospheric pressure to the hydrophobe point at 25° C., i. e., until a drop of the mixture became milky when placed in water at 25° C. The resultant solution which contained about 60% by weight of a melamine formaldehyde condensation product was cooled to room temperature. 6 parts of silica aerogel were stirred into the solution until thoroughly dispersed therein.

The product was a laminating varnish which could be used as such or which could be dehydrated until only 10% by weight of water was present and then diluted with an alcohol such as ethanol or isopropanol until a 50–60% solids solution was obtained.

To prepare a laminate from the unmodified aqueous syrup, a web of absorbent alpha cellulose paper was passed through the solution to retain on the paper about 55% by weight (based on the paper) of resin. The impregnated paper was then dried at about 115° C. until a volatile content of less than 8% was reached.

A lamination was made by superimposing 10 sheets of paper impregnated with a phenol-aldehyde laminating varnish and then placing the pile between two sheets of paper impregnated with the new laminating varnish. The bundle was then heated between highly polished platens at about 155° C. for about 10 minutes under a pressure of 1000 pounds per square inch. The resulting laminate had a high gloss, was highly resistant to abrasion and presented a relatively non-skid surface. The abrasion resistance was measured by counting the number of double rubs with fine sandpaper under uniform pressure needed to wear through the surface lamina. The number of double rubs necessary to wear through the lamina of this invention was 100. The surface lamina of a similar laminate made from an unmodified melamine resin was destroyed in 75 double rubs.

Example II

A melamine laminating syrup was prepared exactly as shown in Example I, except that instead of adding dry silica aerogel, an aqueous suspension of silica aerogel was used in such proportions that 5% by weight of silica aerogel based on the resin content of the syrup was added. The laminates made using this laminating varnish were similar in appearance to those made from the syrup of Example I and had about the same abrasion resistance, i. e., 100 double rubs of fine sandpaper were necessary to wear through the surface lamina.

Samples of laminates from each of the examples and a laminate made from the unmodified melamine syrup were buffed to obtain a perfectly smooth semi-gloss surface and then were tested for anti-skid properties. An ordinary dinner plate was placed on each laminate. The laminates were then slowly tilted at approximately the same rate. The dish slid from the laminate made from unmodified melamine as soon as the tilt angle was 30° from the horizontal. The other dishes did not slip until the angle of tilt exceeded 60°.

Example III

A laminating syrup was made by reacting 126 parts of melamine, 60 parts of urea and 243 parts of formalin at a pH of 8–9 and at reflux temperature at atmospheric pressure until the hydrophobe point was reached. 3% by weight of silica aerogel based on the solids content of the syrup was stirred into the syrup until thoroughly dispersed therein. Paper laminates made from the syrup had a high gloss, excellent abrasion resistance, excellent slip resistance and could be buffed and machine polished with ease.

*Example IV*

A laminating syrup was prepared by reacting 126 parts of melamine with 243 parts of formalin at a pH of 8–9 until the hydrophobe point was reached. 84 parts of dicyandiamide were added to the syrup and the reaction was continued for about 30 minutes at 75° C. The resulting syrup was then modified by admixture with sufficient aqueous suspension of silica aerogel to build up a content of 3% silica aerogel by weight based on the weight of the resin.

Paper laminates made from this varnish had properties similar to those obtained with the syrups of Examples I through III.

*Example V*

A phenolic laminating varnish was prepared by reacting 100 parts of cresylic acid with 100 parts of formalin at 100° C. for about 1 hour in the presence of about 3 parts of 28% ammonium hydroxide. The resulting condensate was dehydrated under vacuum to about 90% solids and then diluted to about 50% solids with ethanol. 3% by weight of silica aerogel, based on the resin content of the syrup were added thereto and thoroughly dispersed therein.

Absorbent alpha cellulose paper was impregnated with the syrup until a resin pickup of 50% by weight based on the weight of the paper was obtained. The impregnated paper was dried at about 115° C. to a volatile content of 6–8%. Two sheets of the impregnated paper were used as the outside sheets of a twelve-sheet lamination and the lamination was cured at about 160° C. for about 10 minutes.

The cured laminate did not wear through after more than 100 double rubs of fine sandpaper and after being buffed to obtain a smooth surface could be tilted to an angle of greater than 60° from the horizontal before a dish would slide therefrom. The buffing could be easily and quickly accomplished by mechanical or hand methods without the appearance of burned spots.

The silica aerogel is a low density, finely divided, porous, white powder. It is prepared from silica aquagels by a unique process which permits drying of the gel without shrinkage of the solid structure. This unique method comprises drying a silica gel at a pressure above the critical pressure of the solvent in the gel. Under these conditions, no shrinkage of the gel occurs and the final product consists essentially of the skeleton of the colloid as it existed in the original undried gel. The method for drying the silica gels may also be said to be a method for replacing the liquid in the gel with air without altering the physical shape of the silica. The aerogels and methods for making them are more fully described in U. S. Patent 2,093,454 to Samuel S. Kistler.

The silica aerogel may be employed in the laminating syrups without modification, i. e., the dry powdery material may be incorporated directly into the syrups. However, if desired, the silica aerogel may be suspended in water or organic liquids or a combination of water and organic liquids prior to adding it to the laminating syrup.

The silica aerogel, whether in the dry or suspension form, may be used within rather wide ranges to modify the laminating syrups. From 1 to 15 parts by weight of silica may be added to 100 parts of resin. The silica aerogel is not a pigment and has relatively little hiding power or color so that even when 15 parts are used, the color characteristics of the laminating syrup are only slightly affected.

On the other hand, laminates made with a syrup containing as little as 1 part of silica aerogel per 100 parts of resin show a substantial increase in abrasion resistance, slip resistance, buffing qualities, etc. When the amount of silica is increased to from 3–5 parts, the abrasion resistance of the laminate is more than 30% better than laminates made from unmodified syrups. Between 5 parts and 15 parts of silica aerogel per 100 parts of resin, the increase in abrasion resistance imparted to the laminates is positive, but not in proportion to the amount of silica added. However, the non-slip or anti-skid properties of the surface of the cured laminates continues to increase with increasing amounts of silica aerogel up to about 15 parts.

The laminating syrups which may be improved by the addition of silica aerogel are solutions or suspensions of thermosetting resins. Generally, the thermosetting resins are so formulated that no curing catalysts are needed in the laminating step, i. e., the resins cure to an insoluble, infusible state by the use of heat and pressure without catalyst. Such resins are not usually surface coating materials per se since they will not cure to a free film without the use of pressure in conjunction with elevated temperatures unless modified with conventional varnish ingredients such as resins or oils.

The thermosetting laminating syrups may be based on aminotriazines such as melamine, ammeline, etc., urea, thiourea, dicyandiamide, phenol, substituted phenols, or a mixture of two or more of the above named compounds. The base materials are reacted with one or more aldehydes, polymers of aldehydes, aldehyde-releasing materials such as acetals, hexamethylene tetramine, etc., until a syrup is obtained which can be rendered stable at ordinary temperatures merely by cooling the reactants or by neutralizing the condensation catalysts or by other conventional means.

When properly formulated and reacted as shown in the examples, a syrup is obtained having a solids content varying from 50 to 65% by weight. The solids may be in solution in the liquid medium which is generally aqueous or they may be in a state of suspension from which they do not separate even on long standing. The syrups may be immediately modified with silica aerogel and used without further modification. In some cases, it is desirable to replace at least a portion of the water by an organic liquid, especially a lower aliphatic alcohol such as ethanol, propanol, isopropanol, butanol, isobutanol, etc. This is accomplished by dehydrating the aqueous syrups under vacuum, by oven drying or other conventional means and then diluting the resins in the desired solvent. In one embodiment of the invention, the aqueous syrups are dehydrated by vacuum distillation until about 10% by weight of water remains and then the syrup is diluted with alcohol until a solids content of about 45 to 65% is reached. The use of alcoholic syrups is especially advantageous when used to impregnate very thin paper since they tend to increase the wet strength of the paper and thus eliminate difficulties in handling the impregnated paper.

The laminating syrups may be used to impregnate paper, glass cloth, asbestos cloth, textile webs such as cotton, wool or rayon fabrics, etc. Impregnation is carried out by conventional methods such as dipping, roll coating, spraying, etc. The amount of resin deposited on the webs may be varied between about 45 and about 65% by weight based on the weight of the webs for most purposes. However, other resin contents may be used for particular applications.

The impregnated webs of this invention are particularly useful as the outer or surface layers of laminates made from a plurality of laminae. The inner layers may be webs or sheets impregnated with the same or with different resins. For example, a laminate may comprise 10 inner sheets of paper impregnated with a phenolic syrup and 2 outer layers impregnated with a silica aerogel modified melamine syrup. Furthermore, the webs or sheets impregnated with silica aerogel modified laminating syrups may be used as surfacing materials for plywood or solid wood.

The laminating syrups of this invention are particularly valuable for surfacing desks, tables, trays, bar tops, etc., which are subjected to hard usage, i. e., where normal abrasion is high and where slippage must be held at a minimum. Even more important is the surfacing of tables, desks, and trays which are used in locations where tilting is a frequent occurrence, such as in airplanes, ships and moving vehicles of all kinds. A table top made from laminated material, the surface layer of which contains silica aerogel, will retain ceramic or glass ware such as dishes, glasses, ash trays, etc., even when tilted to more than 60° from the horizontal as frequently occurs in airplanes and on ships.

A further advantage of laminates surfaced with laminae made from syrup containing silica aerogel is that they may be buffed at high speeds on mechanical buffing machines without danger of burning. The buffing process is made necessary by surface imperfections, which are frequently encountered in commercial laminating processes. Previous laminates could only be buffed under conditions of extremely accurate control since rough or "burned" spots appeared if the pressure or speed used in the buffing operation were not precisely controlled. The new laminating syrups provide a surface which can be buffed at high speeds without danger of burning. Moreover, the buffing operations do not substantially alter the abrasion and slip resistant properties of the laminates since the silica aerogel is thoroughly incorporated throughout the surface laminae and any removal of the surface due to buffing operations merely exposes fresh surfaces containing the silica aerogel.

The thermosetting laminating varnishes of this invention make it possible to provide laminated materials having improved abrasion resistance, slip resistance and which may be buffed without difficulty to remove surface imperfections and attain a high polish.

Laminated table tops, at least one surface lamina of which is impregnated with a laminating varnish containing silica aerogel, are disclosed and claimed in my copending application Serial No. 47,153, filed August 31, 1948, which is a continuation-in-part of this application.

It is obvious that many variations may be made in the processes and products of this invention without departing from the spirit and scope thereof as defined by the appended claims.

What is claimed is:

1. A laminating syrup comprising from 1 to 15 parts of silica areogel and 100 parts of a thermosetting resin taken from the group consisting of phenol-aldehyde, melamine-aldehyde, urea-aldehyde, dicyandiamide-aldehyde resins, melamine-urea-aldehyde and melamine-dicyandiamide-aldehyde resins.

2. A laminating syrup as in claim 1 wherein the resin is a melamine-aldehyde resin.

3. A laminating syrup as in claim 1 wherein the resin is a phenol-aldehyde resin.

4. A laminating syrup comprising from 3 to 5 parts of silica aerogel and 100 parts of a thermosetting resin taken from the group consisting of phenol-aldehyde, melamine-aldehyde, urea-aldehyde, dicyandiamide-aldehyde, melamine-urea-aldehyde and melamine-dicyandiamide-aldehyde resins.

5. A laminating syrup as in claim 4 wherein the resin is a melamine-aldehyde resin.

6. A laminating syrup as in claim 4 wherein the resin is a phenol-aldehyde resin.

EDGAR M. QUEENY.

REFERENCES CITED

The following references are of record in the file of this patent:

UNITED STATES PATENTS

| Number | Name | Date |
|---|---|---|
| 2,224,815 | Glycofrides | Dec. 10, 1940 |
| 2,371,915 | Rector et al. | Mar. 20, 1945 |

Certificate of Correction

Patent No. 2,451,410.    October 12, 1948.

EDGAR M. QUEENY

It is hereby certified that errors appear in the above numbered patent requiring correction as follows:

In the grant, line 3, and in the heading to the printed specification, line 5, State of incorporation, for "Missouri" read *Delaware*;

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*